US012761453B2

(12) United States Patent
Wang et al.

(10) Patent No.: US 12,761,453 B2
(45) Date of Patent: Oct. 13, 2026

(54) OPTICAL LENS AND CAMERA MODULE AND ASSEMBLING METHOD THEREFOR

(71) Applicant: Ningbo Sunny Opotech Co., Ltd., Zhejiang (CN)

(72) Inventors: Mingzhu Wang, Zhejiang (CN); Lifeng Yao, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 821 days.

(21) Appl. No.: 17/041,814

(22) PCT Filed: Mar. 12, 2019

(86) PCT No.: PCT/CN2019/077765

§ 371 (c)(1),
(2) Date: Sep. 25, 2020

(87) PCT Pub. No.: WO2019/184695

PCT Pub. Date: Oct. 3, 2019

(65) Prior Publication Data

US 2021/0011264 A1 Jan. 14, 2021

(30) Foreign Application Priority Data

Mar. 29, 2018 (CN) ......................... 201810274229.2
Mar. 29, 2018 (CN) ......................... 201820437842.7

(51) Int. Cl.
*G02B 13/18* (2006.01)
*G02B 7/02* (2021.01)

(52) U.S. Cl.
CPC ............. *G02B 13/18* (2013.01); *G02B 7/025* (2013.01)

(58) Field of Classification Search
CPC ........ G02B 13/18; G02B 7/025; G02B 7/003; G02B 7/021; G02B 13/0015; G02B 2003/0093; F16B 47/003
See application file for complete search history.

(56) References Cited

U.S. PATENT DOCUMENTS 9,612,450 B2 4/2017 Nagayama et al.
10,302,892 B2 5/2019 Wang et al.
(Continued)

FOREIGN PATENT DOCUMENTS

CN 203708326 7/2014
CN 104395804 3/2015
(Continued)

OTHER PUBLICATIONS

Machine Translation of KR 20090127649 A (Year: 2009).*
(Continued)

*Primary Examiner* — Matthew Y Lee
(74) *Attorney, Agent, or Firm* — Wenderoth, Lind & Ponack, L.L.P.

(57) ABSTRACT

The present application provides an optical camera lens, comprising: a first camera lens component including at least one first camera lens; a second camera lens component including a second lens barrel and at least one second lens mounted in the second lens barrel, the at least one first lens and the at least one second lens together constitute an imageable optical system, and the at least one first lens and the at least one second lens have at least one free-form surface lens; and a connecting medium adapted to fix the first camera lens component and the second camera lens component together. This application also provides a corresponding camera module, an assembly method of the optical camera lens and the camera module.

10 Claims, 5 Drawing Sheets

(56) References Cited

U.S. PATENT DOCUMENTS

| | | | | |
|---|---|---|---|---|
| 2002/0071190 | A1* | 6/2002 | Wada | G02B 7/021 359/821 |
| 2005/0007547 | A1 | 1/2005 | Jones | |
| 2011/0199575 | A1* | 8/2011 | Buchheister | G02B 27/0018 359/601 |
| 2014/0285905 | A1* | 9/2014 | Zhou | G02B 7/10 359/696 |
| 2015/0089789 | A1 | 4/2015 | Nagayama et al. | |
| 2015/0163384 | A1 | 6/2015 | Lee et al. | |
| 2015/0301303 | A1* | 10/2015 | Kim | H04N 23/55 29/428 |
| 2016/0223829 | A1* | 8/2016 | Nagayama | G02B 27/62 |
| 2016/0341935 | A1* | 11/2016 | Chen | G02B 13/0045 |
| 2017/0123178 | A1 | 5/2017 | Wang et al. | |
| 2017/0176705 | A1* | 6/2017 | Wang | G02B 7/025 |

FOREIGN PATENT DOCUMENTS

| | | | | |
|---|---|---|---|---|
| CN | 105445885 | | 3/2016 | |
| CN | 105445888 | | 3/2016 | |
| CN | 105445889 | | 3/2016 | |
| CN | 205080301 | | 3/2016 | |
| CN | 103487914 | | 4/2016 | |
| CN | 207067513 | | 3/2018 | |
| CN | 208384208 | | 1/2019 | |
| EP | 2 933 670 | | 10/2015 | |
| EP | 3 370 098 | | 9/2018 | |
| EP | 3 385 766 | | 10/2018 | |
| JP | 2010-191345 | | 9/2010 | |
| JP | 2014-77904 | | 5/2014 | |
| KR | 10-2006-0037325 | | 5/2006 | |
| KR | 10-2009-0127649 | | 12/2009 | |
| KR | 20090127649 | A * | 12/2009 | G02B 7/021 |
| KR | 10-2017-0065002 | | 6/2017 | |
| KR | 20190087261 | A * | 7/2019 | G02B 7/021 |
| TW | 201346373 | | 11/2013 | |
| TW | M481426 | | 7/2014 | |
| TW | 201732340 | | 9/2017 | |
| TW | 201734534 | | 10/2017 | |

OTHER PUBLICATIONS

Machine translation of KR 20190087261 A (Year: 2019).*

Communication pursuant to Rule 164(1) EPC issued Apr. 21, 2021 in corresponding European Patent Application No. 19775617.4.

International Search Report issued May 20, 2019 in International (PCT) Application No. PCT/CN2019/077765.

Office Action issued May 11, 2024 in corresponding Chinese Patent Application No. 201810274229.2, with English-language Translation.

* cited by examiner

OPTICAL LENS AND CAMERA MODULE AND ASSEMBLING METHOD THEREFOR

CROSS REFERENCES TO RELATED APPLICATIONS

This application claims the priority and rights of Chinese patent applications No. 201810274229.2 and No. 201820437842.7 filed with the China National Intellectual Property Administration (CNIPA) on Mar. 29, 2018, the entire content of the application is incorporated herein by reference.

TECHNICAL FIELD

This application relates to field of optical imaging technology, and specifically, this application relates to an optical camera lens, a camera module and an assembly method thereof.

BACKGROUND

With the popularity of mobile electronic equipments, related technologies of camera modules used in the mobile electronic equipments to help users acquire images (such as videos or images) have been developed and advanced rapidly, and in recent years, camera modules have been widely used in many fields such as medical treatment, security, industrial production and so on.

In order to meet more and more extensive market demands, high pixels, small size, and large aperture are irreversible development trends of the existing camera modules. A large aperture camera lens can bring a large field of view, however, this also causes problems of a longer optical length and a larger angle distortion of view field. For example, a mobile phone camera lens with a view field angle of 130° has a distortion of >10%. In the field of small-sized optical devices, the above-mentioned problems will become more prominent and difficult to be solved.

In recent years, free-form surface technology has become more and more mature, and lenses with free-form surface can be obtained using the free-form surface technology. Based on the free-form surface technology, the progressive multi-focal facial form can be processed on front or back surface of the lens through a free-form surface design software during the optical design, and then a complex surface can be processed by, for example, a lathe. At present, the free-form surface technology has been widely used in the high-end spectacle lens industry. If the free-form surface lens is used in the field of small-size optical devices (such as the field of mobile phone camera modules), it will help to reduce the angle distortion of the large view field, and to a certain extent reduce the total optical length of the camera module. Taking the above-mentioned 130° view field mobile phone camera lens as an example, the use of free-form surface lens is expected to reduce the distortion to less than 2%. If the free-form surface lens is used as an ordinary auto focus module, the total optical length can be reduced by about 10%, the MTF design value can be increased by 8%, and the distortion can be reduced to less than 1%. In other words, the free-form surface lens can reduce or minimize aberration of optical system, realize a function of correcting aberrations and reducing distortion, and can also reduce an overall optical length and/or a volume of the camera module.

However, a free-form surface is a complex aspheric surface, which is irregular and asymmetric in most cases, with multiple symmetry axes. In the field of small-size optical devices (such as the field of mobile phone camera modules), the typical optical camera lens on the market are assembled by a manner of embedding them piece by piece. Specifically, a lens barrel with a stepped bearing surface on a inner side thereof is prepared in advance, and then each lens is inserted into the stepped bearing surface on the inner side of the lens barrel one by one to obtain a complete optical camera lens. Due to the limitation of the mounting process, a facial form of lens selected in the lens barrel is usually a spherical or aspheric surface with rotational symmetry. If the free-form surface lenses are used, an accurate mounting with assembly process of the traditional compact camera module camera lens is impossible. Because in the optical system with the free-form surface lens, non-rotationally symmetric free-form surface camera lens are hard to be symmetrical due to absence of a single optical axis, making it difficult to find an optical center, and optical axis alignment and correction problems cannot be controlled. A lens facial form size of the camera module is often less than 0.7 cm, and in the mounting process of the small-sized lenses, higher mounting requirements and faster mounting capabilities are required. The above problems all make it difficult to apply the free-form surface lenses to compact camera modules.

SUMMARY OF THE INVENTION

According to an aspect of the present application, there provides an optical camera lens, including: a first camera lens component, including at least one first lens; a second camera lens component, including a second lens barrel and at least one second lens mounted in the second lens barrel, the at least one first camera lens and the at least one second camera lens together constitute an imageable optical system, and the at least one first lens and the at least one second lens have at least one free-form surface lens; and a connecting medium adapted to fix the first camera lens component and the second camera lens component together.

In one embodiment, the connecting medium is glue material, which is adapted to support and fix the first camera lens component and the second camera lens component, and makes a relative position between the first camera lens component and the second camera lens component to be maintained at a relative position determined by an active calibration. In another embodiment, the connecting medium may also be a welding medium.

In one embodiment, an included angle between an axis of the first camera lens component and an axis of the second camera lens component is not zero.

In one embodiment, number of the first lens is one, and the first lens is a free-form surface lens.

In one embodiment, number of the at least one second lens is plural, and the at least one second lens has a free-form surface lens.

In one embodiment, the at least one first lens has a free-form surface lens, and the at least one second lens also has a free-form surface lens.

In one embodiment, the first camera lens component further includes a first lens barrel, and the at least one first lens is mounted at an inner side of the first lens barrel.

In one embodiment, the first camera lens component and/or the second camera lens component have an identifier that characterizes facial form direction information of the free-form surface lens contained therein.

In one embodiment, the free-form surface lens has a reference plane perpendicular to its thickness direction, the free-form surface lens has a reference direction in the reference plane, the first camera lens component and/or the second camera lens component have an identifier of the reference direction to characterize the facial form direction information of the free-form surface lens.

In one embodiment, the connecting medium is glue material, which is adapted to support and fix the first camera lens component and the second camera lens component, and makes a difference between an actual reference direction of the free-form surface lens and a reference direction determined by an optical design to be not greater than a predetermined threshold angle, for example, 0.05 degree.

In one embodiment, in a direction along the optical axis of the optical camera lens, there is a gap between the first camera lens component and the second camera lens component.

Another aspect of the present application also provides a camera module, which comprises the optical camera lens described in any one of the foregoing embodiments.

Another aspect of the present application also provides an assembly method of optical camera lens, comprising: pre-positioning a first camera lens component and a second camera lens component, to make at least one first lens and at least one second lens together constitute an imageable optical system, wherein the first camera lens component includes at least one first lens, and the second camera lens component includes a second lens barrel and at least one second lens mounted in the second lens barrel, and the at least one first lens and the at least one second lens have at least one free-form surface lens; adjusting and determining a relative position between the first camera lens component and the second camera lens component based on an active calibration; and bonding the first camera lens component and the second camera lens component with glue material, to make the first camera lens component and the second camera lens component to be fixed and maintained at a relative position determined by the active calibration.

In one embodiment, the at least one first lens has at least one free-form surface lens, and the at least one second lens also has at least one free-form surface lens.

In one embodiment, the active calibration further includes: adjusting and determining the relative positional relationship between the first camera lens component and the second camera lens component by clamping or adsorbing the first camera lens component and/or the second camera lens component according to a measured resolution of an optical system.

In one embodiment, the active calibration further includes: adjusting the relative positional relationship between the first camera lens component and the second camera lens component, to make a difference between an actual reference direction of the free-form surface lens and a reference direction determined by an optical design to be not greater than 0.05 degree, wherein the reference direction is used to characterize facial form direction information of the free-form surface lens.

In one embodiment, the active calibration further includes: moving the first camera lens component along an adjustment plane, and determining a relative position between the first lens and the second camera lens component along the moving direction of the plane according to a measured resolution of an optical system, wherein the movements includes a rotation on the adjustment plane.

In one embodiment, in the active calibration step, the movements further include a translation on the adjustment plane.

In one embodiment, the active calibration further includes: adjusting and determining an included angle between an axis of the first camera lens component and an axis of the second camera lens component according to the measured resolution of the optical system.

In one embodiment, the active calibration further includes: moving the first camera lens component in a direction perpendicular to the adjustment plane, and determining a relative position between the first camera lens component and the second camera lens component in a direction perpendicular to the adjustment plane according to the measured resolution of the optical system.

In one embodiment, the first camera lens component further includes a first lens barrel, and the at least one first lens is mounted at an inner side of the first lens barrel.

In one embodiment, in the pre-positioning step, there is a gap between a bottom surface of the first camera lens component and a top surface of the second camera lens component; and in the bonding step, the glue material is arranged in the gap.

Another aspect of the present application also provides an assembly method of camera module, comprising: assembling an optical camera lens using the assembly method of optical camera lens of any one of the foregoing embodiments; and assembling a camera module based on the optical camera lens.

Compared with prior art, this application can have at least one of the following technical effects:

1. A distortion can be reduced by applying the free-form surface lenses to optical camera lens with small size and large aperture.
2. The distortion can be reduced by applying the free-form surface lens to a camera module with high pixels, small size and large aperture.
3. A total optical length of the camera module can be reduced, thereby reducing volume of the camera module.
4. It can effectively avoid product defects caused by undesired rotation or inaccurate positioning of a rotation direction of the free-form surface lens in the lens barrel during the assembly. Free-form surface lens assembly errors, especially rotation errors, are highly sensitive; if optical camera lens or camera modules containing free-form surface lenses are assembled based on traditional process, the free-form surface lenses are prone to undesired rotation or inaccurate positioning of the rotation direction in the lens barrel, thereby causing problems such as substandard product imaging quality or even failure to image. At least one embodiment in this application can effectively solve the above-mentioned problems.
5. It can effectively improve mounting accuracy of the free-form surface lens in the field of small-size optical devices, thereby improving the imaging quality of the optical camera lens or the camera module.
6. It can effectively improve the production efficiency of optical camera lens or camera modules containing free-form surface lenses and improve the product yield, which is suitable for a mass production.

BRIEF DESCRIPTION OF THE DRAWINGS

Exemplary examples are shown in the referenced drawings. The examples and drawings disclosed herein should be regarded as illustrative rather than restrictive.

DETAILED DESCRIPTION OF EMBODIMENTS

Figure 1:
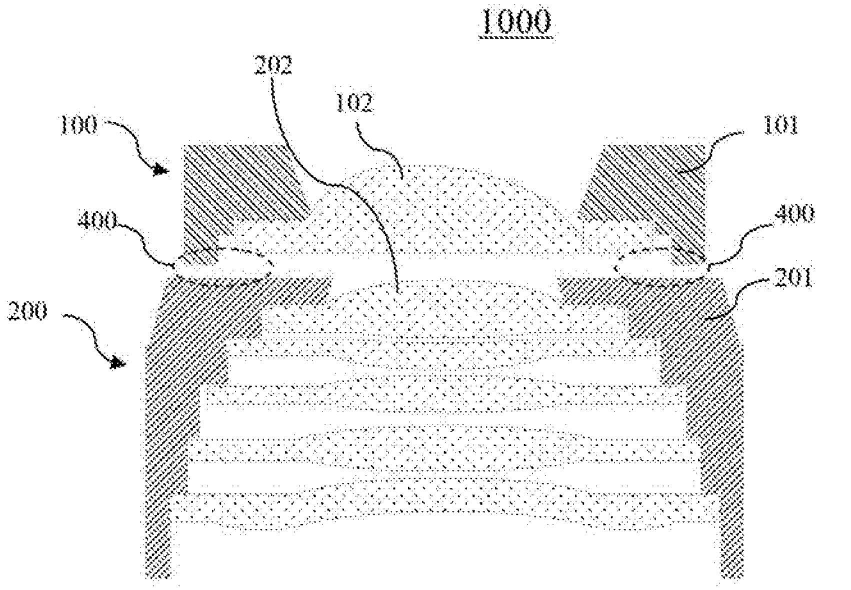
FIG. 1 shows a schematic cross-sectional view of an optical camera lens 1000 according to an embodiment of the present application.

In order to better understand the application, various aspects of the application will be described in more detail with reference to the drawings. It should be understood that these detailed descriptions are only descriptions of exemplary embodiments of the present application, and are not intended to limit the scope of the present application in any way. Throughout the specification, the same reference numerals refer to same elements. The expression "and/or" include any and all combinations of one or more of the associated listed items.

It should be noted that in this specification, expressions such as first, second, etc. are only used to distinguish one feature from another feature, and do not represent any restriction on the feature. Therefore, without departing from the teaching of the present application, the first subject discussed below may also be referred to as the second subject.

In the drawings, the thickness, size, and shape of objects have been slightly exaggerated for ease of description. The drawings are only examples and are not drawn strictly to scale.

It should also be understood that the terms "including", "includes", "having", "containing" and/or "contains", when used in this specification, mean that the stated features, bodies, steps, operations, elements and/or components exists, but does not exclude the presence or addition of one or more other features, bodies, steps, operations, elements, components and/or their combinations. In addition, when expressions such as "at least one of" appear after the list of listed features, the entire listed feature is modified instead of individual elements in the list. In addition, when describing the embodiments of the present application, the use of "may" means "one or more embodiments of the present application". And, the term "exemplary" is intended to refer to an example or illustration.

As used herein, the terms "substantially", "approximately", and similar terms are used as approximate terms, not as terms representing degree, and are intended to illustrate the inherent deviation in the calculated value or the measurement that will be recognized by those skilled in the art.

Unless otherwise defined, all terms (including technical terms and scientific terms) used herein have the same meanings as commonly understood by those skilled in the art to which this application belongs. It should also be understood that terms (such as those defined in commonly used dictionaries) should be interpreted as having meanings consistent with their meanings in the context of related technologies, and will not be interpreted in an idealized or excessively formal sense unless this is clearly defined in this article.

It should be noted that the embodiments in this application and the features in the embodiments can be combined with each other if there is no conflict. Hereinafter, the present application will be described in detail with reference to the drawings and in conjunction with embodiments.

FIG. 1 shows a schematic cross-sectional view of an optical camera lens 1000 according to an embodiment of the present application. The optical camera lens 1000 includes a first camera lens component 100, a second camera lens component 200, and glue material (not shown in the FIG.) for bonding the first camera lens component 100 and the second camera lens component 200 together. Herein, the first camera lens component 100 includes a first lens barrel 101 and a first lens 102, and the first lens 102 is a free-form surface lens. The second camera lens component 200 includes a second lens barrel 201 and five second lenses 202. The glue material is arranged in a gap 400 between the first camera lens component 100 and the second camera lens component 200 to fix the first camera lens component 100 and the second camera lens component 200 together. In this embodiment, the glue material supports and fixes the first camera lens component 100 and the second camera lens component 200, so that a relative position between the first camera lens component 100 and the second camera lens component 200 is maintained at a relative position determined by an active calibration.

Figure 2:
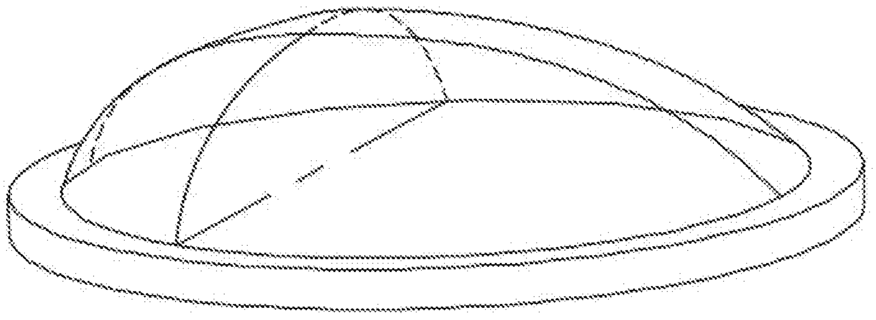
FIG. 2 shows a three-dimensional schematic diagram of a free-form surface lens in an embodiment of the present application.

In this embodiment, the free-form surface lens has a complex optical surface processed based on free-form surface technology. The complex optical surface can be obtained by, for example, designing a progressive multifocal facial form on front or back surface of the lens through a free-form surface design software during optical design, and then processing it through, for example, fine grinding and polishing on a high-precision CNC lathe. FIG. 2 shows a three-dimensional schematic diagram of a free-form surface lens in an embodiment of the present application. Referring to FIG. 2, it can be seen that the free-form surface is a complex aspheric surface, which is irregular and asymmetric in most cases. For a free-form surface lens, it has strong directivity on a plane perpendicular to its thickness direction. In this embodiment, the relative positional relationship between the first camera lens component 100 and the second camera lens component 200 can be adjusted during the active calibration stage, so that a difference between an actual reference direction of the free-form surface lens and a reference direction determined by the optical design is not greater than a predetermined threshold angle, such as 0.05 degree (wherein the reference direction is used to characterize facial form direction information of the free-form surface lens), and then the first camera lens component 100 and the second camera lens component 200 are supported and fixed by the glue material located in the gap 400, so that the relative position between the first camera lens component 100 and the second camera lens component 200 is maintained at the relative position determined by the active calibration, thereby ensuring imaging quality of the optical camera lens.

In contrast, in the traditional optical camera lens assembly process, multiple lenses are assembled in the identical lens barrel. Moreover, a non-rotationally symmetric free-form surface lens does not have the inherent properties of optical axis symmetry, that is, it cannot rely on the optical axis of the lens to perform operations such as assembly positioning and the adjustment, resulting in extremely difficult assembly, especially a rotational positioning of the free-form surface lens in the lens barrel according to the traditional process is very difficult. In other words, free-form surface lens assembly errors, especially rotation errors, are highly sensitive; if optical camera lens or camera modules containing free-form surface lenses are assembled based on a traditional process, the free-form surface lenses are prone to undesired rotation or inaccurate positioning of rotation direction in the lens barrel, thereby causing problems such as substandard product imaging quality or even failure of imaging.

Figure 3:
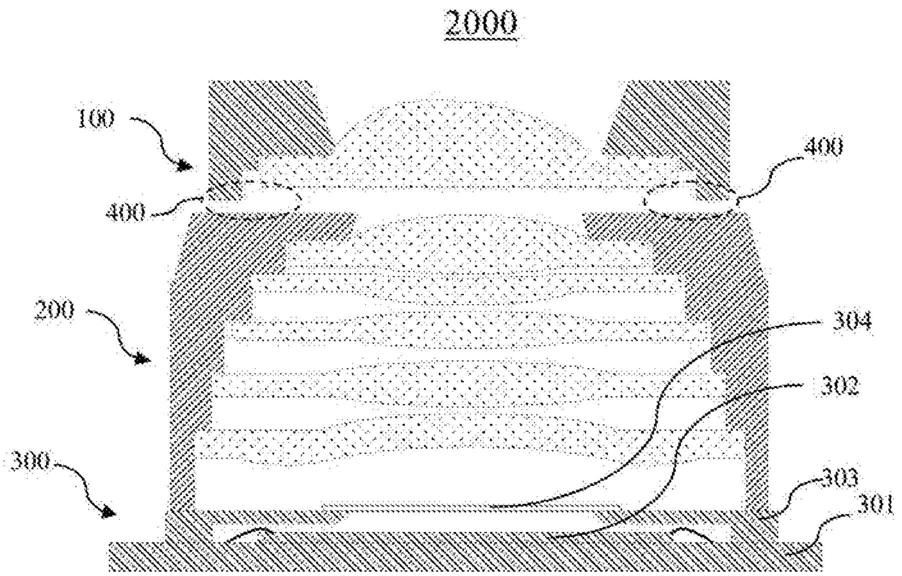
FIG. 3 shows a schematic cross-sectional view of a camera module 2000 according to an embodiment of the present application.

Further, FIG. 3 shows a schematic cross-sectional view of a camera module 2000 according to an embodiment of the present application. The camera module 2000 includes an optical camera lens 1000 as shown in FIG. 1 and a photosensitive component 300. The photosensitive component 300 includes a circuit board 301, a photosensitive chip 302 mounted on the circuit board 301, a cylindrical support 303 mounted on the circuit board 301 and surrounding the photosensitive chip, and a color filter 304 mounted on the cylindrical support 303. Further, the second camera lens component 200 may further includes a motor, and the second lens barrel 202 may be mounted in a carrier of the motor. The motor is mounted on a top surface of the cylindrical support 303 to fix the second camera lens component 200 and the photosensitive component 300 together. It should be noted that in other embodiments of the present application, the motor can also be replaced by other structures such as a cylindrical support, or it can be eliminated and the second lens barrel 201 is directly mounted on the top surface of the cylindrical support 303. It should be noted that in other embodiments, the motor can also be replaced by other types of optical actuators, such as SMA (shape memory alloy) actuators, MEMS actuators, etc. Wherein the optical actuator refers to a device used to cause the optical camera lens to move relative to the photosensitive chip.

The foregoing embodiments may have at least one of the following beneficial effects:

reducing distortion by applying free-form surface lenses to the optical camera lens with small-size, large-aperture;

reducing the distortion by applying the free-form surface lenses to the camera module with high pixels, small size and large aperture;

reducing a total optical length of the camera module, thereby reducing the size of the camera module; and effectively avoiding product defects caused by undesired rotation or inaccurate positioning of a rotation direction of the free-form surface lens in the lens barrel during the assembly.

Further, in one embodiment, a size of the gap 400 in a direction along the optical axis of the optical camera lens may be, for example, 30-100 μm.

Figure 4:
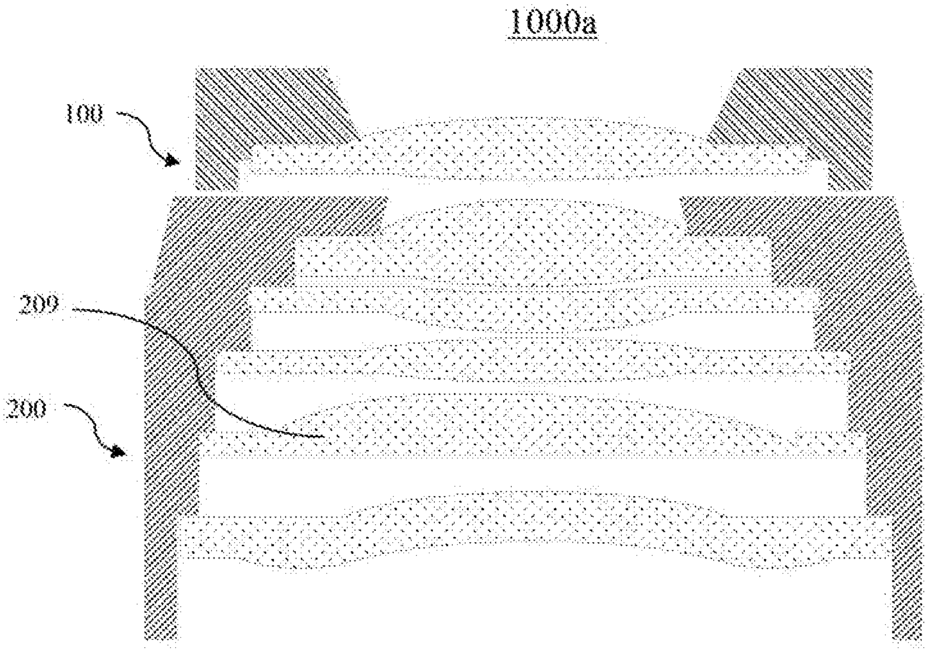
FIG. 4 shows a schematic cross-sectional view of an optical camera lens 1000*a* according to another embodiment of the present application.
Figure 5:
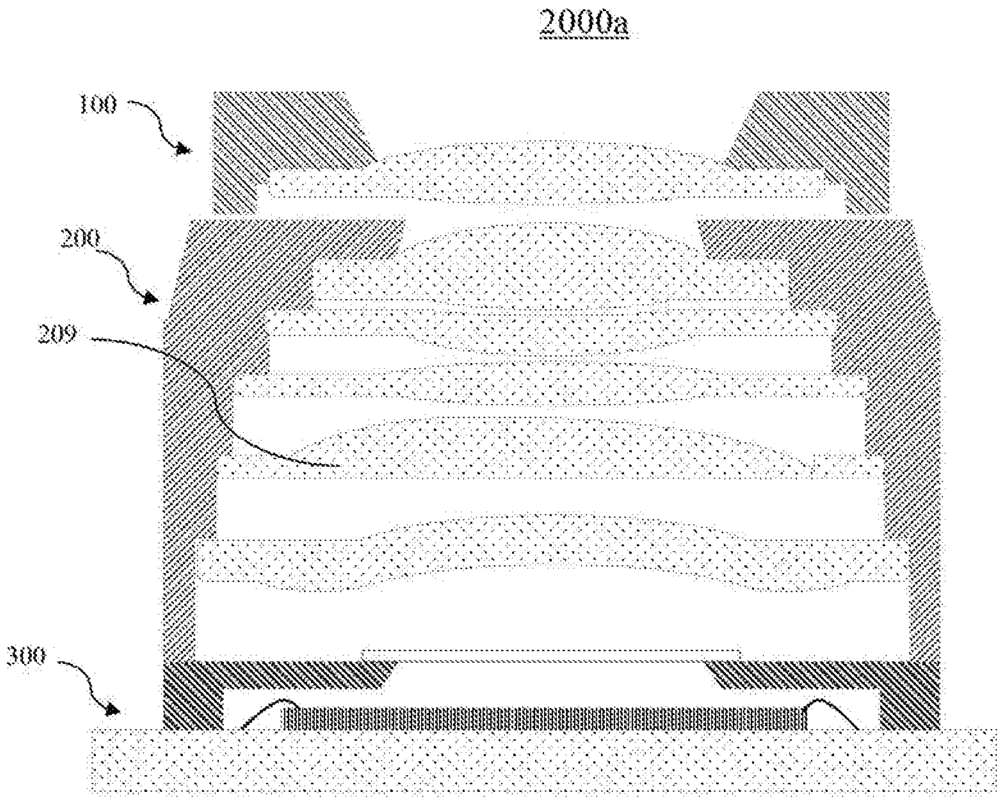
FIG. 5 shows a schematic cross-sectional view of a photosensitive component 2000*a* based on the optical camera lens 1000*a* of FIG. 4.

Further, FIG. 4 shows a schematic cross-sectional view of an optical camera lens 1000*a* according to another embodiment of the present application. As shown in FIG. 4, a difference between this embodiment and the optical camera lens 1000 shown in FIG. 1 is that the second camera lens component 200 has a free-form surface lens 109. The first lens of the first camera lens component 100 adopts conventional lens. Further, FIG. 5 shows a schematic cross-sectional view of a photosensitive component 2000*a* based on the optical camera lens 1000*a* of FIG. 4.

Figure 6:
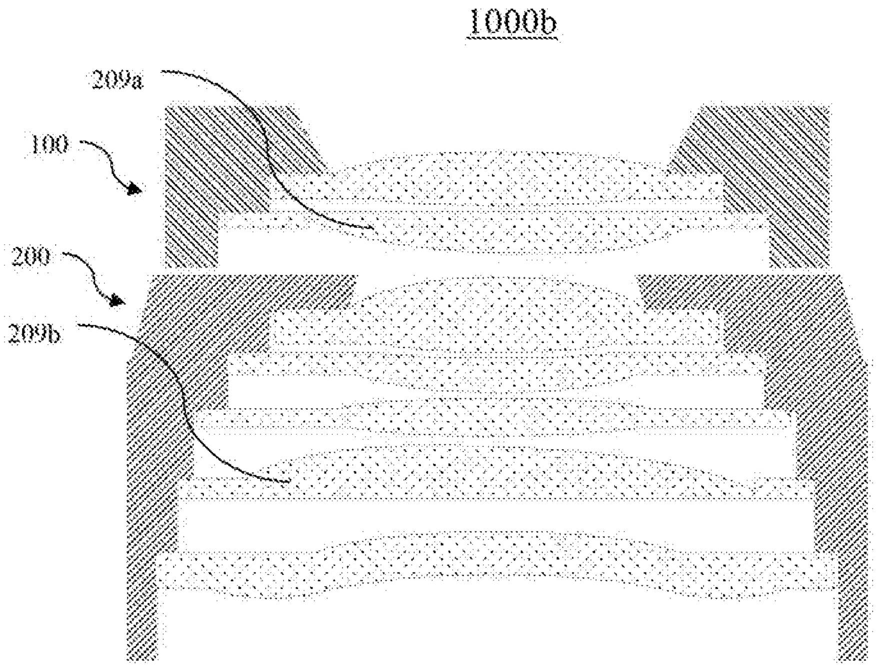
FIG. 6 shows a schematic cross-sectional view of an optical camera lens 1000*b* according to another embodiment of the present application.
Figure 7:
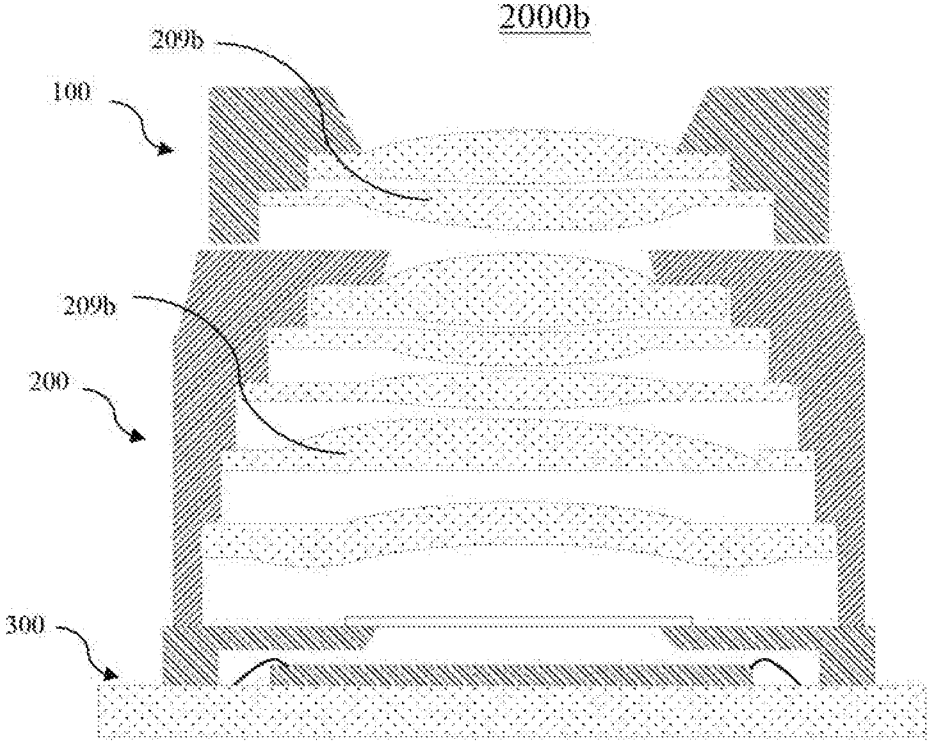
FIG. 7 shows a schematic cross-sectional view of a photosensitive component 2000*b* based on the optical camera lens 1000*b* of FIG. 6.

Further, FIG. 6 shows a schematic cross-sectional view of an optical camera lens 1000*b* according to another embodiment of the present application. As shown in FIG. 6, a difference between this embodiment and the optical camera lens 1000 shown in FIG. 1 is that the first camera lens component 100 and the second camera lens component 200 have free-form surface lenses 109*a* and 109*b*, respectively. Based on this design, during the active calibration stage, a relative position between the first camera lens component 100 and the second camera lens component 200 can be adjusted to make facial form direction of the free-form surface lenses 109*a* and 109*b* complement with each other, thereby better adjusting the actual imaging quality of the optical system. Further, FIG. 7 shows a schematic cross-sectional view of a photosensitive component 2000*b* based on the optical camera lens 1000*b* of FIG. 6. Since the relative position between the first camera lens component 100 and the second camera lens component 200 can be adjusted during the active calibration stage to make the facial form direction of the free-form surface lenses 109*a* and 109*b* complement with each other, thus the camera module 2000*b* can have better imaging quality.

It should be noted that in the above embodiments, number of the lenses of the first camera lens component and the second camera lens component can be adjusted as required. For example, the number of the lenses of the first camera lens component and the second camera lens component may be two and four respectively, or three and three respectively, four and two respectively, or five and one respectively. The total number of the lenses of the entire optical camera lens can also be adjusted as required, for example, the total number of the lenses of the optical camera lens can be six, five or seven.

It should also be noted that in the optical camera lens of the present application, number of the camera lens components is not limited to two, for example, the number of camera lens components may also be three or four, which is greater than two. When there are more than two camera lens components constituting the optical camera lens, two adjacent camera lens components may be regarded as the first camera lens component mentioned above and the second camera lens component mentioned above respectively. For example, when the number of camera lens components of the optical camera lens is three, the optical camera lens may include two first camera lens components and one second camera lens component located between the two first camera lens components, and all of the first lenses of the two first camera lens components and all of the second lenses of the one second camera lens component together constitute an imageable optical system for the active calibration. When the number of camera lens components of the optical camera lens is four, the optical camera lens may include two first camera lens components and two second camera lens components, and the first camera lens component, the second camera lens component, the first camera lens component, the second camera lens component are arranged from top to bottom in order, and all of the first lenses of the two first camera lens components and all of the second lenses of the two second camera lens components together constitute an imageable optical system for the active calibration. Other variations like this will not be repeated herein.

Figure 8:
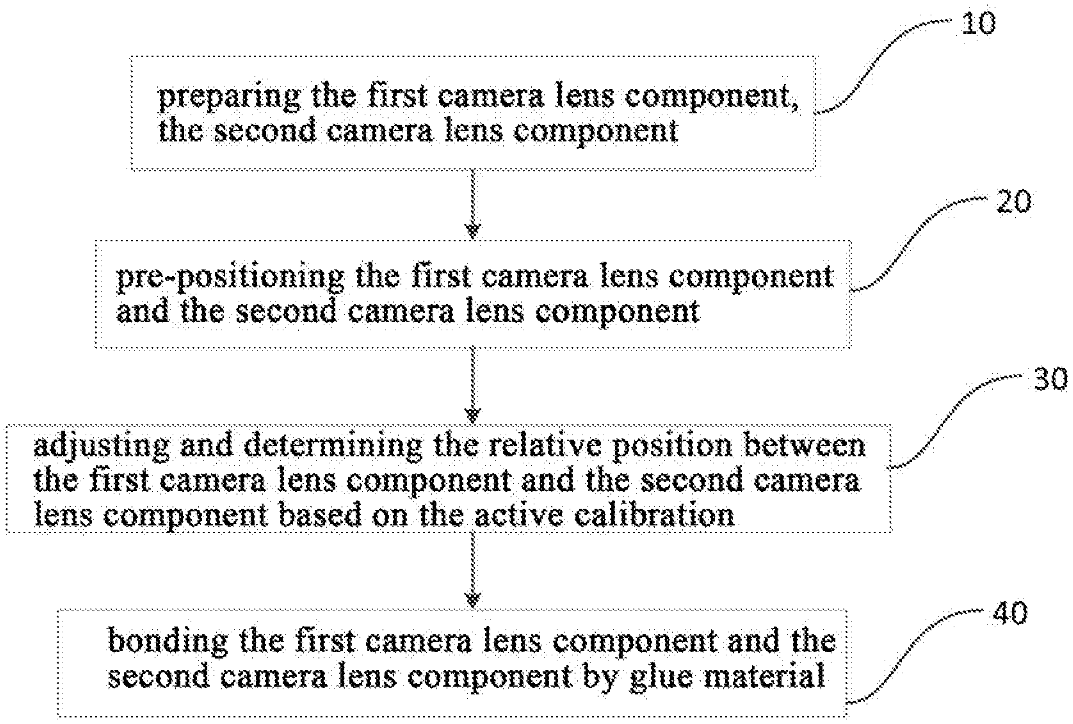
FIG. 8 shows a flowchart of an assembly method of optical camera lens in an embodiment of the present application.

Further, FIG. 8 shows a flowchart of an assembly method of optical camera lens in an embodiment of the present application. Referring to FIG. 8, the method includes:

Step 10: Preparing a first camera lens component and a second camera lens component separated from each other, wherein the first camera lens component includes a first lens barrel and at least one first lens mounted in the first lens barrel, and the second camera lens component includes a second camera lens barrel and at least one second lens mounted in the second lens barrel; wherein at least one free-form surface lens is among the first lenses and the second lenses.

Step 20: Pre-positioning the first camera lens component and the second camera lens component, to make at least one second lens and the at least one first lens together constitute an imageable optical system.

Step 30: Adjusting and determining a relative position between the first camera lens component and the second camera lens component based on active calibration.

Step 40, bonding the first camera lens component and the second camera lens component by glue material. In this step, the first camera lens component and the second camera lens component are supported and fixed by cured glue material, to make the relative position between the first camera lens component and the second camera lens component to be maintained at a relative position determined by the active calibration.

Further, in one embodiment, before step 30 is performed, the glue material is applied into a gap between the first camera lens component and the second camera lens component, and then step 30 is performed to adjust and determine the relative position between the first camera lens component and the second camera lens component. After determining the relative position, perform step 40 to solidify the glue material, so that the cured glue material is used to support the first camera lens component and the second camera lens component, and the relative position between the first camera lens component and the second camera lens component is maintained at the relative position determined by the active calibration. In another embodiment, step 30 may be performed first to adjust and determine the relative position between the first camera lens component and the second camera lens component. After determining the relative position, temporarily remove the first camera lens component (or the second camera lens component), and then apply the glue material, and then move back the first camera lens component (or the second camera lens component) based on the determined relative position. Finally, the glue material is cured so that the relative position between the first camera lens component and the second camera lens component is maintained at the relative position determined by the active calibration.

Figure 9A:
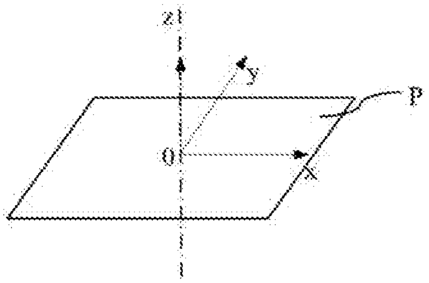
FIG. 9*a* shows a relative position adjustment method in active calibration in an embodiment of the present application.

Further, the active calibration described in this application can adjust the relative position between the first camera lens component and the second camera lens component in multiple degrees of freedom. FIG. 9*a* shows a relative position adjustment manner in the active calibration in one embodiment of the present application. In this adjustment manner, the first camera lens component (or the first lens) can move along x, y, and z directions relative to the second camera lens component (that is, the relative position adjustment in this embodiment has three degrees of freedom). Wherein the z direction is a direction along the optical axis, and the x and y directions are directions perpendicular to the optical axis. The x and y directions are both in an adjustment plane P, and a translation in the adjustment plane P can be decomposed into two components in the x and y directions.

Figure 9B:
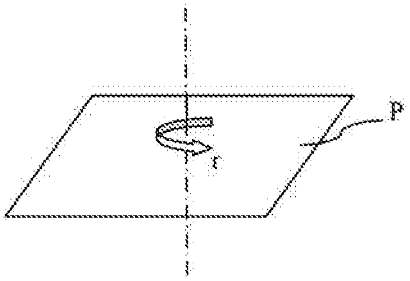
FIG. 9*b* shows a rotation adjustment in active calibration of another embodiment of the present application.

FIG. 9*b* shows a rotation adjustment in the active calibration of another embodiment of the present application. In this embodiment, in addition to the three degrees of freedom in FIG. 9*a*, the relative position adjustment is further added with the degree of freedom in rotation, that is, the adjustment in a r direction. In this embodiment, the adjustment in the r direction is the rotation in the adjustment plane P, that is, the rotation around an axis perpendicular to the adjustment plane P.

Figure 9C:
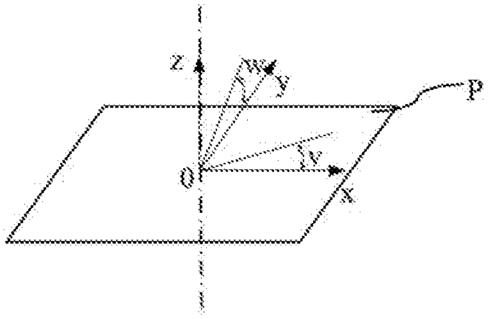
FIG. 9*c* shows a relative positional adjustment manner added with adjustment in v and w directions in active calibration according to another embodiment of the present application.

Further, FIG. 9*c* shows a relative position adjustment manner in the active calibration according to another embodiment of the present application, which is added with adjustment in v and w directions. Wherein, the v direction represents a rotation angle of the xoz plane, and the w direction represents a rotation angle of the yoz plane, the rotation angles of the v direction and the w direction can be combined into a vector angle, and this vector angle represents a total tilt state. In other words, by adjusting the v and w directions, a tilt attitude of the first camera lens component relative to the second camera lens component can be adjusted (that is, a tilt of the optical axis of the first camera lens component relative to the optical axis of the second camera lens component).

The adjustment of the six degrees of freedom of x, y, z, r, v, and w may all affect the imaging quality of the optical system (for example, affect the magnitude of the resolution). In other embodiments of the present application, the relative position adjustment manner may be to adjust only any one of the above six degrees of freedom, or a combination of any two or more of them.

In particular, in one embodiment, the active calibration includes at least calibration in the r direction. Specifically, the active calibration step (step 30) includes: according to a measured resolution of an optical system (in this application, the resolution can be obtained from a measured MTF curve or SFR curve, but the method of acquiring the resolution is not limited thereto), adjusting and determining the relative positional relationship between the first camera lens component and the second camera lens component through clamping or adsorbing the first camera lens component and/or the second camera lens component. Wherein the first camera lens component is moved along the adjustment plane, and the relative position between the first camera lens and the second camera lens component in the direction of movement along the plane is determined according to the measured resolution of the optical system, wherein the movements include a rotation on the adjustment plane, that is, a movement in the r direction. In this embodiment, the first camera lens component and/or the second camera lens component has an identifier that characterizes facial form direction information of the free-form surface lens contained therein.

In one embodiment, the free-form surface lens has a reference plane perpendicular to its thickness direction, the free-form surface lens has a reference direction in the reference plane, and the first camera lens component and/or the second camera lens component have an identifier of the reference direction to characterize the facial form direction information of the free-form surface lens. The free-form surface lens is very sensitive to a rotational positioning in the reference plane; in the active calibration stage, the first camera lens component and the second camera lens component are relatively moved and adjusted in the r direction, which can improve a mounting accuracy on the actual reference direction of the free-form surface lens. For example, a difference between an actual reference direction of the free-form surface lens and a reference direction determined by the optical design can be not greater than 0.05 degree, thereby obtaining a small-size, large-aperture optical camera lens or camera module with high imaging quality. In this embodiment, when the free-form surface lens is performed rotation correction relative to other camera lens, aberration adjustment data can be collected and obtained in real time and corrected, so that the camera lens and/or camera module of the free-form surface lens can obtain better imaging effect. Through the adjustment, the optical system composed of two camera lens components has better imaging performance, for example, the surrounding distortion of imaging is small, and the aberration of the optical system is small. The adjustment index of the active calibration can be set for different needs. As a result, the actively calibrated optical camera lens with different adjustment indexes can meet different optical performances.

On the other hand, in pre-positioning stage, an identifier of the reference direction can help the free-form surface lens to be quickly pre-positioned to a direction determined by the optical design, and then actively adjust it based on the pre-positioning. This will help improve the production efficiency of the optical camera lens or the camera modules. In another embodiment, it is also possible to perform machine recognition on the facial form direction of the free-form surface lens based on machine vision technology, and perform pre-positioning in the r-direction based on the recognition result, and then actively adjust it based on the pre-positioning.

Further, in an embodiment, in the active calibration step, the movements further include a translation on the adjustment plane, that is, the movements in the x, y directions.

Further, in one embodiment, the active calibration further includes: adjusting and determining an included angle between the axis of the first camera lens component and the axis of the second camera lens component according to the measured resolution of the optical system, that is, the adjustment in the w and v directions. In the assembled optical camera lens or camera module, the included angle between the axis of the first camera lens component and the axis of the second camera lens component may be non-zero.

Further, in an embodiment, the active calibration further includes: moving the first camera lens component in a direction perpendicular to the adjustment plane (that is, adjustment in the z direction), according to the measured resolution of the optical system, determining the relative position between the first camera lens component and the second camera lens component in a direction perpendicular to the adjustment plane.

Further, in one embodiment, in the pre-positioning step (step 20), there is a gap between a bottom surface of the first camera lens component and a top surface of the second camera lens component; and in the bonding step (Step 40), and the glue material is arranged in the gap.

Further, in one embodiment, in the preparing step (step 10), the first camera lens component may not have a first lens barrel. For example, the first camera lens component may be composed of a single first lens. In the pre-positioning step (step 20), there is a gap between a bottom surface of the first lens and a top surface of the second camera lens component; and in the bonding step (step 40), the glue material is arranged in the gap. In this embodiment, the first lens may be formed by a plurality of sub-lenses that are integrated with each other to form a whole. In this embodiment, side surface and top surface of non-optical surface of the first lens that are not used for imaging may form a light shielding layer. The light shielding layer may be formed by screen printing a light shielding material on the side and top surface of the first lens.

In one embodiment, in the active calibration step, the second camera lens component can be fixed, the first camera lens component can be clamped by a clamp, and the first camera lens component can be moved under the drive of a six-axis motion mechanism connected with the clamp, thereby realizing the relative movement between the first camera lens component and the second camera lens component in the above six degrees of freedom. Wherein the clamp can be leaned against or partially leaned against the side surface of the first camera lens component, thereby clamping the first camera lens component.

Further, according to one embodiment of the present application, there also provides an assembly method of camera module, including: using the assembly method of optical camera lens of any of the foregoing embodiments to assemble an optical camera lens, and then use the assembled optical camera lens to produce a camera module.

Further, according to another embodiment of the present application, a flowchart of another method for assembling the camera module is provided, and the method includes:

Step 100, preparing a first camera lens component and a camera module component, wherein the camera module component includes a second camera lens component and a photosensitive module combined together, and the first camera lens component includes a first lens barrel and at least one first lens mounted at an inner side of the first lens barrel, and the second camera lens component includes a second lens barrel and at least one second lens mounted in the second lens barrel; in addition, there is at least one free-form surface lens in the first lenses and the second lenses.

Step 200: pre-positioning the first camera lens component and the second camera lens component to make at least one second lens and at least one first lens together constitute an imageable optical system.

Step 300: adjusting and determining a relative position between the first camera lens component and the second camera lens component based on an active calibration.

Step 400, bonding the first camera lens component and the second camera lens component by glue material.

It can be seen that, compared with the previous embodiment, the second camera lens component and the photosensitive module in this embodiment are assembled together to constitute the camera module component, and then the camera module component and the first camera lens component are assembled to obtain a complete camera module. The process of assembling the camera module component and the first camera lens component can also have many variations; for example, referring to the multiple embodiments of the optical camera lens assembly method described above to realize the assembly of the camera module component and the first camera lens component.

The above description is only preferred embodiments of this application and an explanation of the applied technical principles. Those skilled in the art should understand that the scope of the application involved in this application is not limited to the technical solutions formed by the specific combination of the above technical features, and should also cover other technical solutions formed by any combination of above technical features and its equivalent features without departing from the concept of the application. For example, the above-mentioned features and the technical features disclosed in this application (but not limited to) with similar functions are mutually replaced to form a technical solution.

The invention claimed is:

1. An optical camera lens comprising:

a first camera lens component including a first lens barrel and at least one first lens mounted in the first lens barrel;

a second camera lens component including a second lens barrel and at least one second lens mounted in the second lens barrel, the at least one first lens and the at least one second lens together constituting an imageable optical system, an included angle between an optical axis of the first camera lens component and an optical axis of the second camera lens component is not zero, and in a direction along an optical axis of the optical camera lens, a gap is present between the first lens barrel and the second lens barrel; and a connecting medium adapted to fix the first camera lens component and the second camera lens component together, wherein the at least one first lens includes a first free-form surface lens, the at least one second lens includes a second free-form surface lens, and facial form directions of the first and second free-form surface lenses complement each other, wherein the first camera lens component and/or the second camera lens component has an identifier that characterizes facial form direction information of the first and/or second free-form surface lens contained therein, and wherein relative positions of the first camera lens component and the second camera lens component are adjusted to make a difference between an actual reference direction of the first and second free-form surface lenses and a reference direction determined by an optical design to be not greater than 0.05 degree, the reference direction determined by the optical design characterizing the facial form direction information of the first and second free-form surface lenses.

2. The optical camera lens of claim 1, wherein the connecting medium is glue material adapted to support and fix the first camera lens component and the second camera lens component, so that a relative position between the first camera lens component and the second camera lens component is maintained at a relative position determined by an active calibration.

3. The optical camera lens of claim 1, wherein the at least one first lens is one first lens, and the one first lens is the first free-form surface lens.

4. The optical camera lens of claim 1, wherein the at least one second lens is a plurality of second lenses, and the plurality of second lenses includes the second free-form surface lens as one of the plurality of second lenses.

5. The optical camera lens of claim 1, wherein the at least one first lens is mounted at an inner side of the first lens barrel.

6. The optical camera lens of claim 1, wherein the first camera lens component has the identifier that characterizes facial form direction information of the first free-form surface lens contained therein, and the second camera lens component has the identifier that characterizes facial form direction information of the second free-form surface lens contained therein.

7. The optical camera lens of claim 6, wherein the first free-form surface lens has a first reference plane perpendicular to its thickness direction, the first free-form surface lens has a first reference direction in the first reference plane, the first camera lens component has an identifier of the first reference direction to characterize the facial form direction information of the first free-form surface lens, the second free-form surface lens has a second reference plane perpendicular to its thickness direction, the second free-form surface lens has a second reference direction in the second reference plane, and the second camera lens component has an identifier of the second reference direction to characterize the facial form direction information of the second free-form surface lens.

8. The optical camera lens of claim 7, wherein the connecting medium is glue material adapted to support and fix the first camera lens component and the second camera lens component, so that a difference between an actual reference direction of the first and second free-form surface lenses and a reference direction determined by optical design is not greater than a predetermined threshold angle.

9. The optical camera lens of claim 8, wherein the predetermined threshold angle is 0.05 degree.

10. A camera module comprising the optical camera lens according to claim 1.

* * * * *